US011832189B2

(12) United States Patent
Zheng et al.

(10) Patent No.: US 11,832,189 B2
(45) Date of Patent: Nov. 28, 2023

(54) CONTROL METHOD FOR DOZE MODE OF MOBILE TERMINAL, STORAGE MEDIUM AND MOBILE TERMINAL

(71) Applicant: HuiZhou TCL Mobile Communication Co., Ltd., HuiZhou (CN)

(72) Inventors: Jinguo Zheng, HuiZhou (CN); Yanxiang Zhang, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 260 days.

(21) Appl. No.: 17/312,436

(22) PCT Filed: Nov. 1, 2019

(86) PCT No.: PCT/CN2019/115066
§ 371 (c)(1),
(2) Date: Jun. 10, 2021

(87) PCT Pub. No.: WO2020/134566
PCT Pub. Date: Jul. 2, 2020

(65) Prior Publication Data
US 2022/0022139 A1 Jan. 20, 2022

(30) Foreign Application Priority Data

Dec. 26, 2018 (CN) .......................... 201811598741.9

(51) Int. Cl.
*H04W 52/02* (2009.01)
*H04M 1/72454* (2021.01)
*H04M 1/72463* (2021.01)

(52) U.S. Cl.
CPC .... *H04W 52/0264* (2013.01); *H04M 1/72454* (2021.01); *H04M 1/72463* (2021.01); *H04M 2250/12* (2013.01)

(58) Field of Classification Search
CPC ......... H04W 52/0264; H04W 52/0261; H04W 52/0274; H04W 52/0277; H04W 52/0209;
(Continued)

(56) References Cited

U.S. PATENT DOCUMENTS

2004/0181703 A1* 9/2004 Lilja ................. H04W 52/0254
713/324
2013/0179715 A1 7/2013 Sun et al.
(Continued)

FOREIGN PATENT DOCUMENTS

CN 104052857 A * 9/2014
CN 106506281 3/2017
(Continued)

OTHER PUBLICATIONS

Supplementary European Search Report and the European Search Opinion dated Aug. 22, 2022 From the European Patent Office Re. Application No. 19906392.6. (10 Pages).

*Primary Examiner* — Keith Ferguson

(57) ABSTRACT

A control method for a doze mode of a mobile terminal includes: determining whether the mobile terminal conforms with a mode switch condition; detecting whether a virtual motion sensor is disposed in the mobile terminal when the mobile terminal conforms with the mode switch condition; determining whether a duration for which the mobile terminal conforms with the mode switch condition exceeds a predetermined time threshold value, when the virtual motion sensor is disposed in the mobile terminal; and entering the doze mode when the duration for which the mobile terminal conforms with the mode switch condition exceeds the pre-
(Continued)

determined time threshold value. A computer readable storage medium and a mobile terminal are also provided.

14 Claims, 2 Drawing Sheets

(58) Field of Classification Search
CPC ............. H04W 52/02; H04W 52/0251; H04M 1/72454; H04M 1/72463; H04M 2250/12
See application file for complete search history.

(56) References Cited

U.S. PATENT DOCUMENTS

| | | | | |
|---|---|---|---|---|
| 2013/0261769 | A1* | 10/2013 | Hong | ................ H04W 52/0277 700/12 |
| 2015/0195789 | A1* | 7/2015 | Yoon | ................ H04M 1/724631 345/173 |

FOREIGN PATENT DOCUMENTS

| | | | |
|---|---|---|---|
| CN | 107608561 | 1/2018 | |
| CN | 107943409 | 4/2018 | |
| CN | 108647048 | 10/2018 | |
| CN | 109462699 | 3/2019 | |
| KR | 20170084558 A * | 7/2017 | ............... G06F 3/01 |
| WO | WO-2018161539 A1 * | 9/2018 | ........... G06F 3/0487 |
| WO | WO 2020/224417 | 11/2020 | |

* cited by examiner

CONTROL METHOD FOR DOZE MODE OF MOBILE TERMINAL, STORAGE MEDIUM AND MOBILE TERMINAL

RELATED APPLICATIONS

This application is a National Phase of PCT Patent Application No. PCT/CN2019/115066 having International filing date of Nov. 1, 2019, which claims the benefit of priority of Chinese Patent Application No. 201811598741.9 filed on Dec. 26, 2018. The contents of the above applications are all incorporated by reference as if fully set forth herein in their entirety.

FIELD AND BACKGROUND OF THE INVENTION

The present disclosure relates to a technology field of mobile terminals, and more particularly to a control method for a doze mode of a mobile terminal, a storage medium, and a mobile terminal.

GOOGLE supports a doze mode from Android 6.0. In the doze mode, alarms, wakelocks, and network connections in various applications are limited to decrease standby power consumption. However, code logic of GOOGLE requires that a mobile phone has to include a motion sensor. When it is detected that there is no motion sensor, the doze mode is exited directly. As such, the standby power consumption cannot be decreased. Probably, GOOGLE adds this design to provide superior user experience. That is, assuming that a user moves the mobile phone, the doze mode is exited immediately to remove limitations of various applications.

Adding a motion sensor in a middle-end or high-end product is not a great problem. However, adding an extra hardware device in a low-end and low-cost mobile phone weakens product competitiveness of the product on the market without doubt. Accordingly, it is necessary to research and develop a method for a mobile phone without a motion sensor to support the doze mode to optimize the standby power consumption.

Adding an extra hardware device in a low-end and low-cost mobile phone results in a high cost.

SUMMARY OF THE INVENTION

The present disclosure provides a control method for a doze mode of a mobile terminal. The control method includes:

determining whether the mobile terminal conforms with a mode switch condition;

detecting whether a virtual motion sensor is disposed in the mobile terminal when the mobile terminal conforms with the mode switch condition;

determining whether a duration for which the mobile terminal conforms with the mode switch condition exceeds a predetermined time threshold value, when the virtual motion sensor is disposed in the mobile terminal; and entering the doze mode when the duration for which the mobile terminal conforms with the mode switch condition exceeds the predetermined time threshold value.

In some embodiments, the step of detecting whether the virtual motion sensor is disposed in the mobile terminal specifically includes determining whether an application framework layer of the mobile terminal includes a motion sensor object.

In some embodiments, parameters of the motion sensor object at least include a name, a version, a model number, and a manufacturer parameter.

In some embodiments, the mode switch condition refers to that the mobile terminal is in a turned-off screen state and is in a state of being not connected to a power source.

In some embodiments, after the entering the doze mode, the control method further includes:

detecting whether the mobile terminal is switched from the turned-off screen state to a turned-on screen state or from the state of being not connected to the power source to a state of being connected to the power source; and exiting the doze mode when the mobile terminal is switched from the turned-off screen state to the turned-on screen state or from the state of being not connected to the power source to the state of being connected to the power source.

In some embodiments, the time threshold value is one hour.

The present disclosure further provides a computer readable storage medium. The computer readable storage medium stores computer programs therein. The computer programs are executed by a processor to implement the above-mentioned control method.

The present disclosure further provides a mobile terminal. The mobile terminal includes a processor, a storage device, and computer programs stored in the storage device and being operable by the processor. The computer programs are executed by the processor to implement the above-mentioned control method.

The control method for the doze mode of the mobile terminal, the storage medium, and the mobile terminal provided by the present disclosure can control, in a condition that the mobile terminal does not include a motion sensor, the mobile terminal to enter the doze mode as long as the mobile terminal conforms with the state condition of entering the doze mode. This can normally limit operations of the mobile terminal and application software in a background, thereby decreasing standby power consumption of the mobile terminal and optimizing battery life of the mobile terminal.

DESCRIPTION OF SPECIFIC EMBODIMENTS OF THE INVENTION

Figure 1:
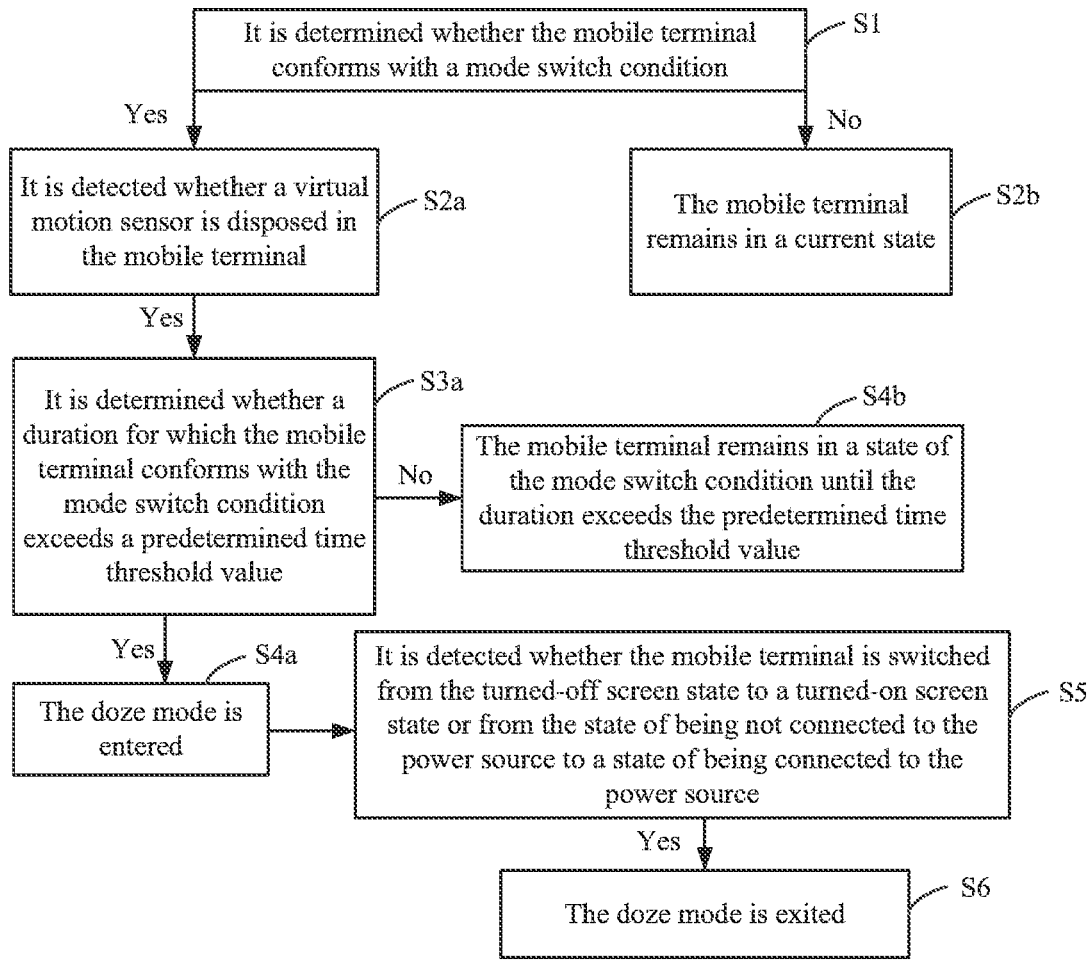
FIG. 1 illustrates a flow chart of a control method for a doze mode of a mobile terminal provided by an embodiment of the present disclosure.

To make the objectives, technical schemes, and technical effect of the present disclosure more clearly and definitely, the present disclosure will be described in detail below by using embodiments in conjunction with the appending drawings. It should be understood that the specific embodiments described herein are merely for explaining the present disclosure but not intended to limit the present disclosure.

Here, it is also noted that in order to prevent the present disclosure from being bleared due to unnecessary details, in the drawings, structures and/or treatment steps closely associated with solutions according to the present disclosure are only illustrated, and other details that have little relation with the present disclosure are omitted.

The present embodiment provides a control method for a doze mode of a mobile terminal. The control method includes:

determining whether the mobile terminal conforms with a mode switch condition;

detecting whether a virtual motion sensor is disposed in the mobile terminal when the mobile terminal conforms with the mode switch condition;

determining whether a duration for which the mobile terminal conforms with the mode switch condition exceeds a predetermined time threshold value, when the virtual motion sensor is disposed in the mobile terminal; and entering the doze mode when the duration for which the mobile terminal conforms with the mode switch condition exceeds the predetermined time threshold value.

In some embodiments, the step of detecting whether the virtual motion sensor is disposed in the mobile terminal includes:

determining whether an application framework layer of the mobile terminal includes a motion sensor object.

In some embodiments, parameters of the motion sensor object at least include a name, a version, a model number, and a manufacturer parameter.

In some embodiments, the control method further includes:

generating a virtual motion sensor when the application framework layer of the mobile terminal does not include the motion sensor object.

In some embodiments, the mode switch condition refers to that the mobile terminal is in a turned-off screen state and is in a state of being not connected to a power source.

In some embodiments, after the entering the doze mode, the method further includes:

detecting whether the mobile terminal is switched from the turned-off screen state to a turned-on screen state; and exiting the doze mode when the mobile terminal is switched from the turned-off screen state to the turned-on screen state.

In some embodiments, after the entering the doze mode, the method further includes:

detecting whether the mobile terminal is switched from the state of being not connected to the power source to a state of being connected to the power source; and exiting the doze mode when the mobile terminal is switched from the state of being not connected to the power source to the state of being connected to the power source.

In some embodiments, the time threshold value is one hour.

The present embodiment provides the control method for the doze mode of the mobile terminal, specifically, a control method for a doze mode of a mobile terminal without a motion sensor. As shown in FIG. 1, the control method includes the following steps.

In S1, it is determined whether the mobile terminal conforms with a mode (a doze mode) switch condition. In detail, the mode switch condition at least refers to that the mobile terminal is in a turned-off screen state and is in a state of being not connected to a power source. Certainly, the turned-off screen state or the state of being not connected to the power source can separately serve as the mode switch condition of the mobile terminal according to practical requirements. For example, when an offline document of an electronic book is viewed via the mobile terminal, exchanging data via a network or operating software is not required. A user who views the electronic book is not affected even when the mobile terminal enters the doze mode.

In S2a, it is detected whether a virtual motion sensor is disposed in the mobile terminal when the mobile terminal conforms with the mode switch condition. In detail, it is determined whether an application framework layer of the mobile terminal includes a motion sensor object. Herein, it is noted that a code of the conventional doze mode requires authentication of a motion sensor of a mobile terminal. However, the mobile terminal of the present embodiment does not include a practical motion sensor and corresponding driver application. Accordingly, in the present step, disposing the virtual motion sensor in the application framework layer corresponds to the authentication of the motion sensor of the mobile terminal.

In practical, the doze mode works in the application framework layer of an operating system. In the conventional doze mode, acquiring the authentication of the motion sensor is a process of acquiring an established motion sensor object in the application framework layer. In fact, the motion sensor is only an object for the application framework layer. Confirming whether the motion sensor is virtual is not required.

Since the mobile terminal of the present embodiment does not include the motion sensor, the step of determining whether the application framework layer of the mobile terminal includes the motion sensor object certainly does not have a result. Accordingly, after the above-mentioned determining process ends, generating a virtual motion sensor corresponds to the authentication of the motion sensor in the doze mode. In detail, parameters of the motion sensor object at least include a name, a version, a model number, and a manufacturer parameter. Parameters of the generated virtual motion sensor also include information of a name, a version, a model number, and a manufacturer parameter.

In S2b, the mobile terminal remains in a current state when the mobile terminal does not conform with the mode switch condition.

In S3a, it is determined whether a duration for which the mobile terminal conforms with the mode switch condition exceeds a predetermined time threshold value, when the virtual motion sensor is disposed in the mobile terminal. In detail, it is determined whether the state (the turned-off screen state and the state of being not connected to the power source) of the mobile terminal lasts for a predetermined time. For example, it is determined whether the duration for which the mobile terminal is in the turned-off screen state and is in the state of being not connected to the power source lasts for thirty minutes or exceeds one hour.

In S4a, when the duration for which the mobile terminal conforms with the mode switch condition exceeds the predetermined time threshold value, the doze mode is entered. This can normally limit prompting functions, uploading data via a network, and working in a background of various application software.

In S4b, when the duration for which the mobile terminal conforms with the mode switch condition does not exceed the predetermined time threshold value, the mobile terminal remains in a state of the mode switch condition until the duration exceeds the predetermined time threshold value.

When the mobile terminal in the present embodiment exits the doze mode, it is also necessary to conform with a specific state condition. That is, after the entering the doze mode, the method can further include the following steps.

In S5, it is detected whether the mobile terminal is switched from the turned-off screen state to a turned-on screen state or from the state of being not connected to the power source to a state of being connected to the power source.

In S6, if yes, the doze mode is exited.

The present disclosure further provides another implementation manner, that is, provides a mobile terminal. The terminal includes at least one processor, a storage device, and computer programs stored in the storage device and being operable by the processor. The computer programs are executed by the at least one processor to implement the above-mentioned control method. The mobile terminal provided by the present embodiment does not include a practical motion sensor and corresponding driver software.

Figure 2:
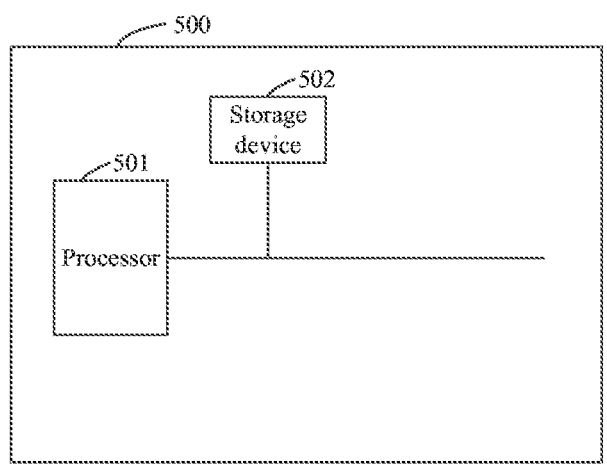
FIG. 2 illustrates a structure diagram of a mobile terminal provided by an embodiment of the present disclosure.

As shown in FIG. 2, the mobile terminal 500 includes a processor 501 and a storage device 502. The processor 501 is electrically connected to the storage device 502.

The processor 501 is a control center of the mobile terminal 500, is connected with all the parts of the whole mobile terminal by various interfaces and lines and is configured to execute various functions of the mobile terminal and process the data by operating the software programs and/or the modules stored in the storage device 502, and to call the data stored in the storage device 502 so as to carry out integral monitoring on the mobile terminal.

In the present embodiment, the processor 501 in the mobile terminal 500 loads instructions corresponding to processes of one or more application programs into the storage device 502, and the application programs stored in the storage device 502 are executed by the processor 501 to implement various functions:

determining whether the mobile terminal conforms with a mode switch condition;

detecting whether a virtual motion sensor is disposed in the mobile terminal when the mobile terminal conforms with the mode switch condition;

determining whether a duration for which the mobile terminal conforms with the mode switch condition exceeds a predetermined time threshold value, when the virtual motion sensor is disposed in the mobile terminal; and entering a doze mode when the duration for which the mobile terminal conforms with the mode switch condition exceeds the predetermined time threshold value.

In some embodiments, in the detecting whether the virtual motion sensor is disposed in the mobile terminal, the processor 501 executes the following step of:

determining whether an application framework layer of the mobile terminal includes a motion sensor object.

In some embodiments, parameters of the motion sensor object at least include a name, a version, a model number, and a manufacturer parameter.

In some embodiments, after the entering the doze mode, the processor 501 further executes the following steps of:

detecting whether the mobile terminal is switched from a turned-off screen state to a turned-on screen state; and exiting the doze mode when the mobile terminal is switched from the turned-off screen state to the turned-on screen state.

In some embodiments, after the entering the doze mode, the processor 501 further executes the following steps of:

detecting whether the mobile terminal is switched from a state of being not connected to a power source to a state of being connected to the power source; and exiting the doze mode when the mobile terminal is switched from the state of being not connected to the power source to the state of being connected to the power source.

Figure 3:
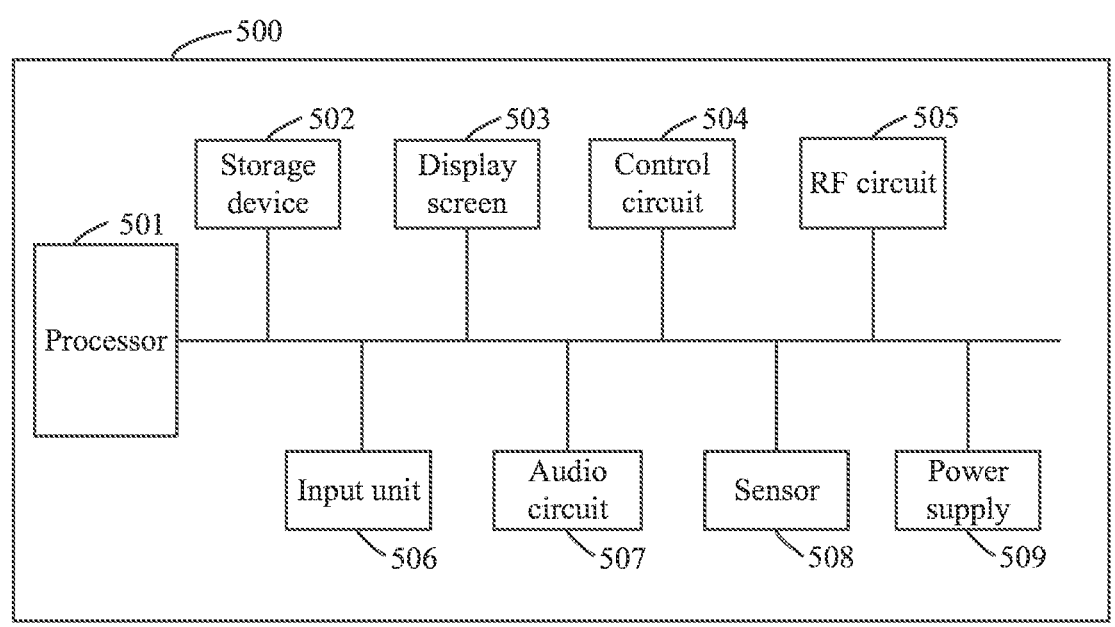
FIG. 3 illustrates another structure diagram of a mobile terminal provided by an embodiment of the present disclosure.

In some embodiments, as shown in FIG. 3, the mobile terminal 500 further includes a display screen 503, a control circuit 504, a radio frequency (RF) circuit 505, an input unit 506, an audio circuit 507, a sensor 508, and a power supply 509. The processor 501 is electrically connected to the display screen 503, the control circuit 504, the RF circuit 505, the input unit 506, the audio circuit 507, the sensor 508, and the power supply 509.

The display screen 503 may be configured to display information input by the user or information provided for the user and various graphical user interfaces of the mobile terminal. The graphical user interfaces may be constituted by graphics, texts, icons, videos and any combinations of them. In practical applications, the display screen 503 may serve as an operation interface in the embodiments of the present disclosure.

The control circuit 504 is electrically connected to the display screen 503 and configured to control the display screen 503 to display information.

The RF circuit 505 is configured to receive or transmit RF signals, establish wireless communications with network devices or other mobile terminals via wireless communications, and receive or transmit signals from or to network devices or other mobile terminals.

The input unit 506 may be configured to receive input number, character information, or user feature information (e.g., fingerprint), and to generate keyboard, mouse, joystick, optical or trajectory ball signal inputs related to a user's setting and functional control. The input unit 506 may include a fingerprint identification module.

The audio circuit 507 may provide an audio interface between the user and the mobile terminal via a speaker and a microphone.

The sensor 508 is configured to collect information of an external environment. The sensor 508 may include an environmental brightness sensor, an optical sensor, and other sensors. In detail, the optical sensor may include an environmental light sensor and a proximity sensor. It is noted that the mobile terminal 500 in the present embodiment does not include a motion sensor (e.g., an accelerator sensor, an accelerometer sensor, a gyroscope and the like).

The power supply 509 is configured to supply power to each part. In some embodiments, the power supply 509 may be logically connected with the processor 501 by a power supply management system, so as to implement functions of charge management, discharge management, power consumption management and the like by the power supply management system.

The present disclosure further provides yet another implementation manner, that is, provides a computer readable storage medium. The computer readable storage medium stores computer programs therein. The computer programs are executed by a processor to implement the following steps of:

determining whether the mobile terminal conforms with a mode switch condition;

detecting whether a virtual motion sensor is disposed in the mobile terminal when the mobile terminal conforms with the mode switch condition;

determining whether a duration for which the mobile terminal conforms with the mode switch condition exceeds a predetermined time threshold value, when the virtual motion sensor is disposed in the mobile terminal; and entering a doze mode when the duration for which the mobile terminal conforms with the mode switch condition exceeds the predetermined time threshold value.

In some embodiments, in the detecting whether the virtual motion sensor is disposed in the mobile terminal, the computer programs are executed by the processor to specifically implement the following step of:

determining whether an application framework layer of the mobile terminal includes a motion sensor object.

In some embodiments, parameters of the motion sensor object at least include a name, a version, a model number, and a manufacturer parameter.

In some embodiments, the computer programs are executed by the processor to further implement the following step of:

generating a virtual motion sensor when the application framework layer of the mobile terminal does not include the motion sensor object.

In some embodiments, the mode switch condition refers to that the mobile terminal is in a turned-off screen state and is in a state of being not connected to a power source.

In some embodiments, after the entering the doze mode, the computer programs are executed by the processor to further implement the following steps of:

detecting whether the mobile terminal is switched from the turned-off screen state to a turned-on screen state; and exiting the doze mode when the mobile terminal is switched from the turned-off screen state to the turned-on screen state.

In some embodiments, after the entering the doze mode, the computer programs are executed by the processor to further implement the following steps of:

detecting whether the mobile terminal is switched from the state of being not connected to the power source to a state of being connected to the power source; and exiting the doze mode when the mobile terminal is switched from the state of being not connected to the power source to the state of being connected to the power source.

The embodiments of the mobile terminal and the computer readable storage medium of the present disclosure include all technical features of the embodiments of the above-mentioned control method for the doze mode of the mobile terminal. The expansion and explanation of the specification are substantially the same as each of the embodiments of the above-mentioned control method and not repeated herein again.

It should be appreciated from the above that the control method for the doze mode of the mobile terminal, the storage medium, and the mobile terminal provided by the present disclosure can control, in a condition that the mobile terminal does not include a motion sensor, the mobile terminal to enter the doze mode as long as the mobile terminal conforms with the state condition of entering the doze mode. This can normally limit operations of the mobile terminal and application software in a background, thereby decreasing standby power consumption of the mobile terminal and optimizing battery life of the mobile terminal.

Although the embodiments of the present disclosure have been shown and described, it would be appreciated by those skilled in the art that various changes, modifications, replacements and alternatives can be made to the embodiments without departing from the principles and spirit of the present disclosure, and the scope of the present disclosure is as defined by the appended claims and equivalents thereof.

What is claimed is:

1. A control method for a doze mode of a mobile terminal, comprising:

determining whether the mobile terminal conforms with a mode switch condition;

detecting whether a virtual motion sensor is disposed in the mobile terminal in response to the mobile terminal conforming with the mode switch condition;

determining whether a duration for which the mobile terminal conforms with the mode switch condition exceeds a predetermined time threshold value in response to the virtual motion sensor being disposed in the mobile terminal; and entering the doze mode when the duration for which the mobile terminal conforms with the mode switch condition exceeds the predetermined time threshold value, wherein the step of detecting whether the virtual motion sensor is disposed in the mobile terminal comprises:

determining whether an application framework layer of the mobile terminal includes a motion sensor object, wherein parameters of the motion sensor object at least comprise a name, a version, a model number, and a manufacturer parameter, and wherein the control method further comprises:

remaining in a state of the mode switch condition until the duration exceeds the predetermined time threshold value, when the duration for which the mobile terminal conforms with the mode switch condition does not exceed the predetermined time threshold value.

2. The control method of claim 1, wherein the control method further comprises:

generating the virtual motion sensor when the application framework layer of the mobile terminal does not include the motion sensor object.

3. The control method of claim 1, wherein the mode switch condition refers to that the mobile terminal is in a turned-off screen state and is in a state of being not connected to a power source.

4. The control method of claim 3, wherein after the entering the doze mode, the control method further comprises:

detecting whether the mobile terminal is switched from the turned-off screen state to a turned-on screen state; and exiting the doze mode in response to the mobile terminal being switched from the turned-off screen state to the turned-on screen state.

5. The control method of claim 3, wherein after the entering the doze mode, the control method further comprises:

detecting whether the mobile terminal is switched from the state of being not connected to the power source to a state of being connected to the power source; and exiting the doze mode in response to the mobile terminal being switched from the state of being not connected to the power source to the state of being connected to the power source.

6. The control method of claim 1, wherein the time threshold value is one hour.

7. A non-transitory computer readable storage medium, wherein the computer readable storage medium stores computer programs therein, and the computer programs are executed by a processor to implement the following steps of:

determining whether a mobile terminal conforms with a mode switch condition;

detecting whether a virtual motion sensor is disposed in the mobile terminal in response to the mobile terminal conforming with the mode switch condition;

determining whether a duration for which the mobile terminal conforms with the mode switch condition exceeds a predetermined time threshold value in response to the virtual motion sensor being disposed in the mobile terminal; and entering a doze mode when the duration for which the mobile terminal conforms with the mode switch condition exceeds the predetermined time threshold value, wherein in the detecting whether the virtual motion sensor is disposed in the mobile terminal, the computer programs are executed by the processor to implement the following step of:

determining whether an application framework layer of the mobile terminal includes a motion sensor object, wherein parameters of the motion sensor object at least comprise a name, a version, a model number, and a manufacturer parameter; and wherein the computer programs are executed by the processor to further implement the following step of:

remaining in a state of the mode switch condition until the duration exceeds the predetermined time threshold value, when the duration for which the mobile terminal conforms with the mode switch condition does not exceed the predetermined time threshold value.

8. The non-transitory computer readable storage medium of claim 7, wherein the computer programs are executed by the processor to further implement the following step of:

generating the virtual motion sensor when the application framework layer of the mobile terminal does not include the motion sensor object.

9. The non-transitory computer readable storage medium of claim 7, wherein the mode switch condition refers to that the mobile terminal is in a turned-off screen state and is in a state of being not connected to a power source.

10. The non-transitory computer readable storage medium of claim 9, wherein after the entering the doze mode, the computer programs are executed by the processor to further implement the following steps of:

detecting whether the mobile terminal is switched from the turned-off screen state to a turned-on screen state; and exiting the doze mode in response to the mobile terminal being switched from the turned-off screen state to the turned-on screen state.

11. The non-transitory computer readable storage medium of claim 9, wherein after the entering the doze mode, the computer programs are executed by the processor to further implement the following steps of:

detecting whether the mobile terminal is switched from the state of being not connected to the power source to a state of being connected to the power source; and exiting the doze mode in response to the mobile terminal being switched from the state of being not connected to the power source to the state of being connected to the power source.

12. A mobile terminal, wherein the mobile terminal comprises a processor, a storage device, and computer programs stored in the storage device and being operable by the processor, and the computer programs are executed by the processor to implement the following steps of:

determining whether the mobile terminal conforms with a mode switch condition;

detecting whether a virtual motion sensor is disposed in the mobile terminal in response to the mobile terminal conforming with the mode switch condition;

determining whether a duration for which the mobile terminal conforms with the mode switch condition exceeds a predetermined time threshold value in response to the virtual motion sensor being disposed in the mobile terminal; and entering a doze mode when the duration for which the mobile terminal conforms with the mode switch condition exceeds the predetermined time threshold value, wherein in the detecting whether the virtual motion sensor is disposed in the mobile terminal, the computer programs are executed by the processor to implement the following step of:

determining whether an application framework layer of the mobile terminal includes a motion sensor object, wherein parameters of the motion sensor object at least comprise a name, a version, a model number, and a manufacturer parameter; and wherein the computer programs are executed by the processor to further implement the following step of:

remaining in a state of the mode switch condition until the duration exceeds the predetermined time threshold value, when the duration for which the mobile terminal conforms with the mode switch condition does not exceed the predetermined time threshold value.

13. The mobile terminal of claim 12, wherein after the entering the doze mode, the computer programs are executed by the processor to further implement the following steps of:

detecting whether the mobile terminal is switched from a turned-off screen state to a turned-on screen state; and exiting the doze mode in response to the mobile terminal being switched from the turned-off screen state to the turned-on screen state.

14. The mobile terminal of claim 12, wherein after the entering the doze mode, the computer programs are executed by the processor to further implement the following steps of:

detecting whether the mobile terminal is switched from a state of being not connected to a power source to a state of being connected to the power source; and exiting the doze mode in response to the mobile terminal being switched from the state of being not connected to the power source to the state of being connected to the power source.

* * * * *